A. S. HUBBARD.
ELECTRICAL SYSTEM OF DISTRIBUTION.
APPLICATION FILED JUNE 22, 1907.
987,300.
Patented Mar. 21, 1911.
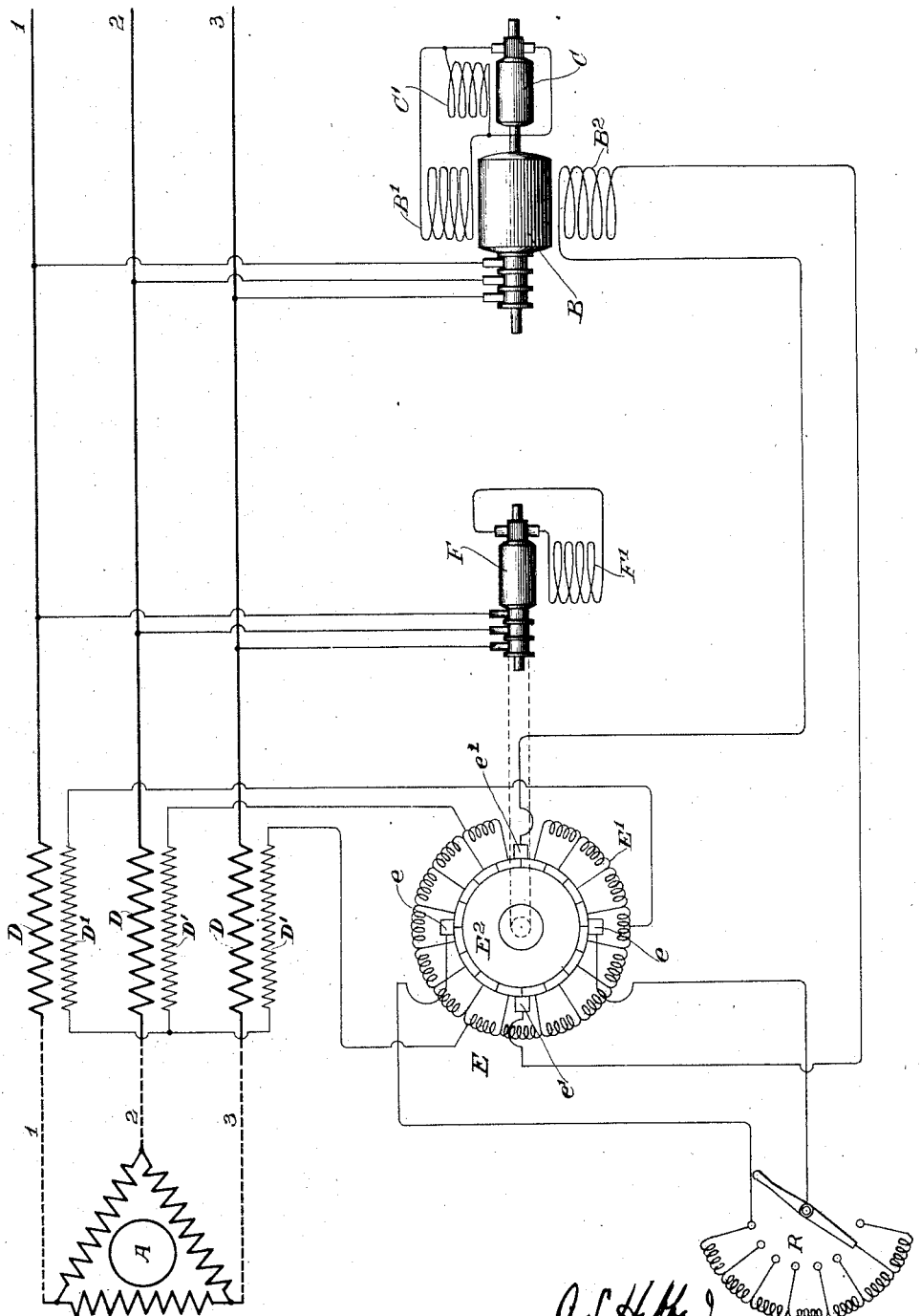

UNITED STATES PATENT OFFICE.

ALBERT S. HUBBARD, OF BELLEVILLE, NEW JERSEY, ASSIGNOR TO GOULD STORAGE BATTERY COMPANY, A CORPORATION OF NEW YORK.

ELECTRICAL SYSTEM OF DISTRIBUTION.

987,300.  Specification of Letters Patent.  Patented Mar. 21, 1911.

Application filed June 22, 1907. Serial No. 380,211.

*To all whom it may concern:*

Be it known that I, ALBERT S. HUBBARD, a citizen of the United States, and a resident of Belleville, Essex county, State of New Jersey, have invented certain new and useful Improvements in Electrical Systems of Distribution, of which the following is a specification.

My invention relates to electrical systems of distribution, especially to those employing alternating currents.

It has for its object the provision of improved apparatus by which the power factor of the circuit may be kept reasonably constant. In such systems varying loads give rise to varying induction and condensance in the circuit and thus cause leading or lagging currents. In most cases there is no definite relation between the amount of current consumed on the system and the lead or lag of the current. The efficiency of the system is deleteriously affected by such variations of power factor and the effect is serious where such variations are frequent and large.

By my invention I provide a power factor compensator connected to the system which is automatically controlled by a synchronously driven electric machine in accordance with wattless energy changes in the circuit so that the effect of the compensator upon the circuit is varied as the wattless energy changes. With unity power factor, that is, when the current and electro-motive-force of the alternating current circuit are in phase, the power factor compensator would be so regulated as to have substantially no effect upon the power factor of the circuit, whereas if the currents are lagging ones, due to great inductance in the circuit, the compensator would be so regulated as to reduce the lag of the current. On the other hand, if the current is a leading one, due to great condensance in the circuit, the compensator would be so regulated as to reduce the lead of the current. Because I regulate in accordance with the wattless energy changes of the circuit, the regulation is effective although the power factor changes are not coincident with the current changes and although they bear no definite relation thereto. The normal value of the power factor compensator is fixed by means that are independent of the fluctuations of current and power factor of the system, and the regulation is effected by varying the value of the compensator from its normal value by the wattless energy changes of the system. Furthermore the power factor compensation is controlled in its action by current taken directly from a synchronously driven field coil, the coil being excited by current proportional to and substantially in phase with the current of the system. Because of this simple arrangement there is no time lag in the regulating action due to the inertia of moving parts and the regulation is much more efficient.

The power factor compensator is, in the present instance, a synchronous motor connected across the alternating current circuit in which compensation is to be effected. It is well known that an over-excited synchronous motor acts as a condensance and therefore tends to produce leading currents, while an under-excited synchronous motor acts as an inductance and so tends to produce a lagging current in the circuit. By employing a large synchronous motor revolving freely and varying the excitation of the field of this motor in definite relation to the power factor changes of the circuit or in accordance with the wattless energy changes of the circuit, I cause the motor to have such a condensance or an inductance as will tend to produce leading or lagging currents and so will offset the lagging or leading currents on the circuit. Thus the greater the lag that tends to develop in the circuit, the greater will be the condensance of the synchronous motor and this condensance will offset the inductance of the circuit tending to cause the lag. Vice versa, if the circuit has great condensance the field of the synchronous motor is automatically weakened and thereby causes the motor to have an inductance that will offset the condensance of the circuit. The synchronous motor is itself normally given a unity power factor by a field winding having a substantially constant current. Preferably this current is of such a value as to give the synchronous motor a field strength that will cause the motor to act neither as an inductance nor a condensance when the power factor of the system is unity. To properly regulate the motor to cause it to suitably compensate for changes in the power factor of the system, I provide apparatus which produces a current that is substantially zero when the power factor of the system is unity and varies in direction and intensity as the power factor shifts from unity in one direction or the other. This current may be supplied to a second field winding on the synchronous motor in such a way that it increases the energization of the field when it is in one direction caused by lagging current on the system, and reduces the energization when it is in the other direction due to a leading current on the system. To obtain the best results this current should have an intensity in either direction corresponding to the extent of the variation of the power factor from unity and to the strength of the current of the system. The apparatus that I specifically employ for this purpose is a regulating converter or rectifier that has been more specifically described in my prior application Serial No. 324,293, filed July 2, 1906. This converter receives a current that varies in direct accordance with the current changes of the circuit but supplies two direct currents, one of which varies in substantial accordance with the energy components of the alternating current, while the other varies in substantial accordance with the non-energy components of the alternating current, or in accordance with the wattless energy.

The power factor compensator may be connected at any part of the circuit either at the power house or at a substantial distance therefrom. In most cases it will be found most advantageous at the latter location and this location is indicated in the drawing.

The drawing accompanying this specification is a diagram of one specific embodiment of my invention.

A indicates a polyphase alternating current generator supplying current to the transmision leads 1, 2, 3.

B represents the armature of the synchronous motor constituting the power factor compensator above referred to and is connected across the leads 1, 2, 3, as indicated. The transmission lines are shown dotted at the left hand end to indicate that the generator A may be at considerable distance from the other apparatus shown.

B' is a field coil for a synchronous motor and in the present instance is shown as being supplied by current from a direct current exciter C mechanically connected to the synchronous motor. The current in the coil B' may be substantially constant. B² is a second field coil for the synchronous motor, the action of the latter being varied by variations of current therein. I will now show how the current in this coil B² is varied in definite relation to the power factor changes of the circuit and in accordance with the wattless energy changes of the circuit.

D, D, D, represent the primaries of series transformers one of which is in each of the transmission lines. D', D', D' are the secondaries of these transformers and must therefore have a current that varies in direct accordance with the variations of the current on the transmission lines. In the present instance these secondaries are star connected.

E represents a converter which is supplied by the current of the secondaries D'. This converter in its preferred form has been specifically described and claimed in the prior application of mine above referred to and, as to some of its features, it has been more particularly described in an application filed by Edward Van Wagenen, Serial No. 324,424, filed July 2, 1906. The converter as described in these applications is one having induction but devoid of motor action, the windings of the converter being carried on a rotatable iron core, there being no field magnet or polar projections of any kind. As indicated in the drawing the three primaries D' are connected to the winding of the converter at points 120° apart, so that the three out of phase currents will produce a rotating field. The converter is driven in synchronism with the generator by a synchronous motor F connected across the alternating current circuit. This motor should preferably be so constructed as to maintain its synchronism as completely as possible. The converter is therefore driven in synchronism with the electro-motive-force of the alternating current circuit, while the winding of the converter is such that the rotating field produced by the currents in the winding E' rotates in the opposite direction and is necessarily in synchronism with the current of the alternating current circuit. When the power factor is unity the rotating field will be fixed in space at a definite position. E² is the commutator of the converter upon which bear the brushes e and the brushes e'. Brushes e are placed upon the commutator at the points of maximum difference of electro-motive-force when the power factor is unity. Brushes e' are at the points of substantial equal electro-motive-force when the power factor is unity, being placed at substantially 90 electrical degrees (in the present instance also 90 geometrical degrees) from brushes e. When the power factor is unity there will be no current developed in any circuit connected to the brushes e' but a direct current will flow in any circuit connected to the brushes e which is proportional in value to the currents of the alternating current circuit. When, however, the current leads or lags, that is, when there is a departure of the power factor from unity, the rotating field must take a different position in space so that the brushes e are no longer at the position of maximum electro-motive-force. Moreover, for the same reasons, brushes e' are no longer at the position of equal electro-motive-force, but are subjected to an electro-motive-force in one direction or the other according to whether the currents of the alternating current circuit are leading or lagging. In the present instance, I utilize this converter for regulation in the following manner. The current supplied to the circuit of the brushes $e'$ is employed as a regulating current by which to vary the field strength of the synchronous motor. In the present instance this is effected by connecting the brushes $e'$ directly with the field coil $B^2$. The circuit of the brushes $e$ is in the present instance connected to an adjustable resistance R. By proper adjustment of this resistance the value of the current in the circuit of the coil $B^2$ may be made to bear the desired relation between the wattless energy changes of the main circuit and the field strength changes required to properly reduce such wattless energy changes. I do not desire to limit myself to the employment of only one of these currents supplied by the converter E for the purpose of regulating this power factor compensator, but in most cases it is preferable to follow the specific arrangement shown in the drawing. The coil $E^2$ will be so wound and connected to the brushes $e'$ that when the currents of the main circuit are leading ones the current in the coil $B^2$ will be in a direction such as to make the coils $B'$ and $B^2$ additive in their effects, while such coils will act differentially when the current is reversed in the circuit of the coil $B^2$ due to the presence of leading currents on the main circuit.

From the above it will be apparent that my improvements are especially efficacious because of their simplicity, there being few, if any, parts to get out of order. By using a rectifier of the general nature shown the regulating currents for varying the field of the motor B flow directly thereto from the transformer secondaries $D'$. The currents from the secondaries $D'$ are merely divided in accordance with the energy and wattless components of the system, the wattless component being commutated by the brushes $e'$ and supplied directly to the field $B^2$. In this way there is no time lag due to the inertia of moving parts and the strength of the field $B^2$ is at any instant not only responsive to, but is substantially proportional to, the wattless energy component of the system.

While I have described and explained the operation of a specific embodiment of my invention showing the apparatus that I prefer to employ, I desire it to be understood that I do not wish to be limited to the specific features shown and described as I believe my broad invention as set out in the appended claims is not restricted to such specific features.
Having thus described my invention what I claim as new and desire to secure by Letters Patent, is, 1. In an alternating current system of distribution, a power factor compensator connected to the system, and means for controlling the same including a source of current substantially independent of fluctuations on the system and a source of current that has a value definitely related to the power factor changes of the system.

2. In an alternating current system of distribution, a synchronous motor connected to the system, and means for controlling the field strength of the same including a source of current substantially independent of fluctuations on the system and a source of current that has a value definitely related to power factor changes of the system.

3. In an alternating current system of distribution having a varying power factor, a synchronous motor connected to the system, a source of substantially constant current for energizing the field of said motor, and means for supplying a second current for energizing said field varying with power factor changes of the system.

4. In an alternating current system of distribution, apparatus connected thereto and adapted to act as a condensance, means for normally fixing the value of said apparatus, means for producing a regulating current varying with the current lag in the system, and independent means for regulating said apparatus responsively to variations of said regulating current.

5. In an alternating current system of distribution, apparatus connected thereto and adapted to act as a condensance or an inductance, means for producing a regulating current varying in direction and value responsively to changes of current lag and lead in the system, and means for regulating said apparatus responsively to variations of said regulating current.

6. The combination with an alternating current circuit, of a converter connected thereto, a direct current circuit supplied by said converter with a current having a definite relation to the wattless energy component of the alternating current energy, a synchronous motor connected to the alternating current circuit, and means for regulating the field strength thereof in accordance with the variations of said direct current.

7. The combination with an alternating current circuit, of a converter connected thereto, a direct current circuit supplied by said converter with a current varying with the wattless energy changes of the alternating current circuit, a synchronous motor connected to the alternating current circuit, and means for regulating the field strength thereof in accordance with the variations of said direct current.

8. The combination with an alternating current circuit, a power factor compensator connected thereto, a converter connected thereto to receive a current varying with that of the alternating current circuit and arranged to produce two direct currents one of which varies in definite relation to power factor changes of the alternating current circuit, and means for regulating the power factor compensator responsively to variations of the direct current which varies in definite relation to power factor changes.

9. The combination with an alternating current circuit, a synchronous motor connected thereto, a converter connected thereto to receive a current varying with that of the alternating current circuit and arranged to produce two direct currents one of which varies in definite relation to power factor changes of the alternating current circuit, and means for varying the field strength of said motor responsively to variations of one of said direct currents.

10. The combination with an alternating current circuit, a power factor compensator connected thereto, a converter connected thereto to receive a current varying with that of the alternating current circuit and arranged to produce two direct currents one of which varies in accordance with wattless energy changes of the alternating current circuit, and means for regulating the power factor compensator responsively to variations of one of said direct currents.

11. The combination with an alternating current circuit, a synchronous motor connected thereto, a converter connected thereto to receive a current varying with that of the alternating current circuit and arranged to produce two direct currents one of which varies in accordance with wattless energy changes of the alternating current circuit, and means for varying the field strength of said motor responsively to variations of the latter current.

12. The combination with an alternating current circuit, of a synchronous motor connected thereto, two coils for regulating the same, means for supplying one of said coils with a current that varies with the power factor changes of the system, and means for supplying the other of said coils with a current whose value is independent of said power factor changes.

13. The combination with an alternating current circuit, of a synchronous motor connected thereto, two field windings for regulating the same, means for supplying one of said field windings with a current that varies with the power factor changes of the system, and means for supplying the other of said field windings with a current whose value is independent of said power factor changes.

14. The combination with an alternating current circuit, of a synchronous motor connected thereto, a field winding for said motor arranged to receive a substantially constant current, a second field winding therefor, and means for supplying current to the same having a value varying with changes of power factor of the system.

15. The combination with an alternating current circuit, of a synchronous motor connected thereto, a field winding for said motor arranged to receive a substantially constant current, a second field winding therefor, and means for supplying current to the same having an intensity relatively increasing as the power factor of the system departs from unity.

16. In an alternating current system of distribution, a synchronous motor connected to the system, means for fixing the normal strength of the field of said motor, apparatus for producing a current having a direction dependent upon the power factor of the system, and means for varying the strength of said field responsively to changes in said current.

17. In an alternating current system of distribution, a synchronous motor connected to the system, a field winding therefor receiving a substantially constant current, a second field winding therefor, and means for supplying the same with a current varying in direction according as the power factor shifts in one direction or another from a given value.

18. An alternating current circuit, a power factor compensator connected thereto and means for producing a direct current for regulating said compensator that varies in direction as the alternating current lags or leads.

19. An alternating current circuit, a power factor compensator connected thereto and means for producing a direct current for regulating said compensator that varies in direction as the alternating current lags or leads and varies in strength with the extent of the lag or lead.

20. An alternating current circuit, a synchronous motor connected thereto, means for producing a regulating current varying in direction as the alternating current lags or leads, and means for causing the regulating current to increase and decrease the field strength of the motor according to its direction.

21. The combination of an alternating current circuit, a power factor compensator connected thereto, a series transformer in the alternating current circuit, a synchronously driven converter supplied thereby, brushes on the commutator of the converter bearing on points normally of substantially equal potential, a coil in said circuit, and means for affecting said compensator by the current in said coil.

22. The combination of a polyphase alternating current circuit, a power factor compensator connected thereto, series transformers in different conductors of the alternating current circuit, a synchronously driven converter supplied thereby and wound to produce a rotary field, brushes on the commutator of the converter bearing on points normally of substantially equal potential, a coil in said circuit, and means for affecting said compensator by the current in said coil.

23. The combination of an alternating current circuit, a synchronous motor connected thereto, a series transformer in the alternating current circuit, a synchronously driven converter supplied thereby, brushes on the commutator of the converter bearing on points normally of substantially equal potential, a coil in said circuit, and means for affecting the field strength of said motor by the current in said coil.

24. The combination of a polyphase alternating current circuit, a synchronous motor connected thereto, series transformers in different conductors of the alternating current circuit, a synchronously driven converter supplied thereby and wound to produce a rotary field, brushes on the commutator of the converter bearing on points normally of substantially equal potential, a coil in said circuit, and means for affecting the field strength of said motor by the current in said coil.

25. In an alternating current system of distribution, a synchronous motor connected to the system, means for fixing the normal strength of the field of said motor, apparatus for producing a current having a value definitely related to the wattless energy of the system, and means for varying the strength of said field responsively to changes in said current.

26. The combination with an alternating current circuit, of a power factor compensator for said circuit, a synchronously driven electric machine arranged to produce a current varying with wattless energy changes of the circuit and means for regulating the power factor compensator responsive to variations in said current.

27. The combination with an alternating current circuit, of a power factor compensator connected thereto, a synchronously driven electric machine arranged to produce a current varying with wattless energy changes of said circuit and a coil on the compensator connected directly to said machine for regulating the power factor compensator responsive to variations in said current.

28. The combination with an alternating current circuit, of a power factor compensator for said circuit, an electric machine having a synchronously driven field structure energized by currents substantially in phase with the current of the circuit and arranged to produce a current varying with wattless energy changes of the circuit and means for regulating the power factor compensator responsive to variations in said current.

In testimony whereof, I have signed my name to this specification, in the presence of two subscribing witnesses.

ALBERT S. HUBBARD.

Witnesses:
 EDWIN SEGER,
 ANNA DALY.